United States Patent
Jung

(10) Patent No.: US 9,804,582 B2
(45) Date of Patent: Oct. 31, 2017

(54) METHOD FOR UPDATING MODULE INFORMATION IN BATTERY MODULE STRUCTURE

(71) Applicant: Hyundai Motor Company, Seoul (KR)

(72) Inventor: In Sung Jung, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 484 days.

(21) Appl. No.: 14/292,379

(22) Filed: May 30, 2014

(65) Prior Publication Data

US 2015/0160641 A1    Jun. 11, 2015

(30) Foreign Application Priority Data

Dec. 10, 2013 (KR) ........................ 10-2013-0152853

(51) Int. Cl.
*G05B 19/05* (2006.01)
*G05B 19/042* (2006.01)
*H04L 12/40* (2006.01)

(52) U.S. Cl.
CPC ........... *G05B 19/05* (2013.01); *G05B 19/042* (2013.01); *H04L 12/40169* (2013.01); *G05B 2219/1136* (2013.01); *G05B 2219/24136* (2013.01); *H04L 2012/40215* (2013.01); *H04L 2012/40273* (2013.01)

(58) Field of Classification Search
CPC ................. G05B 18/042; G05B 18/05; G05B 2219/1136; G05B 2219/24136; H04L 12/40169; H04L 2012/40215; H04L 2012/40273
See application file for complete search history.

(56) References Cited

U.S. PATENT DOCUMENTS

| 5,684,796 | A | * | 11/1997 | Abidi | ................ | H04L 29/12009 |
| | | | | | | 370/254 |
| 9,070,908 | B2 | * | 6/2015 | Sim | ........................ | H01M 2/024 |
| 2010/0190041 | A1 | | 7/2010 | Hou et al. | | |
| 2012/0268069 | A1 | * | 10/2012 | Park | .................. | H01M 10/4207 |
| | | | | | | 320/116 |
| 2013/0149572 | A1 | * | 6/2013 | Matsuo | ................... | H01M 2/34 |
| | | | | | | 429/61 |

(Continued)

FOREIGN PATENT DOCUMENTS

| EP | 2081038 A1 | 7/2009 |
| EP | 2495800 A1 | 9/2012 |

(Continued)

*Primary Examiner* — Eric Oberly
(74) *Attorney, Agent, or Firm* — McDermott Will & Emery LLP

(57) ABSTRACT

A method for updating lower module information in a battery module structure in which an upper controller controls and manages a lower module configured of a plurality of battery modules and lower battery managers connected to each of the battery modules by communicating with each of the lower battery managers. The method includes when the lower module is additionally connected, recognizing, by the upper controller, the addition of the lower module by exchanging a message with the added lower module. The added lower module is registered by assigning a new unique ID to the added lower module by exchanging the message with the added lower module by the upper controller.

9 Claims, 2 Drawing Sheets

(56) References Cited

U.S. PATENT DOCUMENTS

2013/0175976 A1* 7/2013 Rana ................... H02J 7/0016
                                                            320/107
2016/0229307 A1* 8/2016 Brochhaus ............. B60R 16/03

FOREIGN PATENT DOCUMENTS

| GB | 2341258 A | 3/2000 |
|----|-----------|--------|
| JP | 07-176333 A | 7/1995 |
| JP | 2001-313081 A | 11/2001 |
| JP | 2002-042897 A | 2/2002 |
| KR | 10-2011-0013747 A | 2/2011 |
| KR | 10-2013-0023030 A | 3/2013 |
| KR | 10-2013-0033197 A | 4/2013 |
| KR | 10-2013-0075372 A | 7/2013 |

\* cited by examiner

METHOD FOR UPDATING MODULE INFORMATION IN BATTERY MODULE STRUCTURE

CROSS-REFERENCE TO RELATED APPLICATION

This application claims under 35 U.S.C. §119(a) the benefit of priority to Korean Patent Application No. 10-2013-0152853 filed in the Korean Intellectual Property Office on Dec. 10, 2013, the entire contents of which are incorporated herein by reference.

TECHNICAL FIELD

The present disclosure relates to a battery module structure, and more particularly, to a method for automatically recognizing whether a module is added or removed and newly updating module information in a battery module structure.

BACKGROUND

Generally, a battery for a vehicle or a power storage apparatus for other applications adopts a battery package structure in which a plurality of batteries are connected in series and parallel so as to store and output high-output, high-capacity electrical energy.

In the battery package structure, a battery pack which is configured by connecting a plurality of battery modules to each other, and a battery management system (BMS), which controls and manages each of the battery modules, may be configured by various methods. For example, there may be a battery module structure which includes a plurality of lower battery managers measuring each battery module and a single upper controller controlling the plurality of lower battery managers.

In the battery module structure, the lower battery managers are connected to each of the battery modules to collect information on the corresponding battery modules. Further, the upper controller is connected to each of the lower battery managers to control and manage the battery pack, such that the upper controller may control and manage each of the battery modules using the lower battery managers.

The lower battery managers and the upper controller configure the battery management system, in which the battery management system collects battery state information, such as voltage, current, temperature, and state of charge of the battery pack and provides the collected battery state information to another controller inside/outside a vehicle to control the vehicle, charging, or the like.

Since the battery module structure may conveniently apply various battery requirements and may save costs, the battery module structure is highly likely to be applied in configuring the battery pack in the future.

Meanwhile, in the battery module structure, the upper controller needs to know how many individual components, i.e., lower modules, in which the battery modules are combined with the lower battery managers, are configured.

However, since information on the number of lower modules is stored in software of the upper controller in a fixed state according to the related art, the upper controller may not be suitable for a general purpose.

The software (SW) of the battery management system (BMS) is highly likely to be manufactured in the future in a platform structure which is independent of the number of lower modules so as to save costs.

Further, in the battery pack and the battery system to which the battery module structure is applied, the number of lower modules may be different, and therefore, the upper controller needs to directly recognize a change in the module configuration, but a general technique of recognizing the lower module has not yet been proposed.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to solve the above-described problems associated with prior art. The present disclosure provides a method for allowing an upper controller to automatically recognize an addition and a removal of a lower module and newly update lower module information in a battery module structure.

An exemplary embodiment of the present disclosure provides a method for updating lower module information in a battery module structure in which an upper controller controls and manages a lower module configured of a plurality of battery modules and lower battery managers connected to each of the battery modules by communicating with each of the lower battery managers. The method includes recognizing the addition of the lower module by exchanging a message with the added lower module by the upper controller when the lower module is additionally connected. The upper controller registers the added lower module by assigning a new unique ID to the added lower module by exchanging the message with the added lower module.

The step of recognizing the addition of the lower module may include transmitting the message to the upper controller when the added lower module is connected and an operation thereof starts. The message, which is transmitted by the added lower module to recognize that a new lower module is connected, is received by the upper controller.

The step of recognizing the addition of the lower module may further include receiving the message of the added lower module by the upper controller and then confirming that measurement information in a battery pack is discontinuously changed to finally recognize that the new lower module is connected.

The message which is transmitted by the added lower module may be a message of a specific controller area network (CAN) message ID or a message of a CAN message ID selected within a predefined ID range.

The message which is transmitted by the added lower module may be the message of the CAN message ID selected within the predefined ID range. When a plurality of lower modules are additionally connected, and the added lower module exchanges information with the upper controller to confirm that another lower module transmitting the message of the same CAN message ID is present, the added lower module may transmit a message of another ID within the ID range.

The step of registering the added lower module may include transmitting a response command to the added lower module through CAN communications by the upper controller. When the lower module performs a response, a new unique ID is assigned to the lower module by the upper controller.

The method for updating lower module information in a battery module structure may further include recognizing that a pre-registered lower module is removed by the upper controller. After confirming that the lower module is removed, the information on the removed lower module is deleted.

The step of recognizing that the lower module is removed may include periodically receiving the CAN message from the registered lower modules by the upper controller. It is recognized by the upper controller that the pre-registered lower module is removed by confirming that the CAN message of the lower module of a specific ID among the registered lower modules is not received.

The step of recognizing that the lower module is removed may further include confirming, by the upper controller, the lower module removed by transmitting the response command and confirming the response to the lower module of the ID which does not transmit the CAN message.

The method for updating lower module information in a battery module structure may further include deleting the information on the removed lower module by the upper controller and then newly assigning the unique ID to the rest of the lower modules by exchanging the message.

According to exemplary embodiments of the present disclosure, it is possible to secure versatility while minimizing an increase in system costs at the time of applying the vehicle having the battery module structure by automatically recognizing the addition and removal of the lower module the upper controller and applying changes of the lower module in the battery module structure.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

Figure 1:
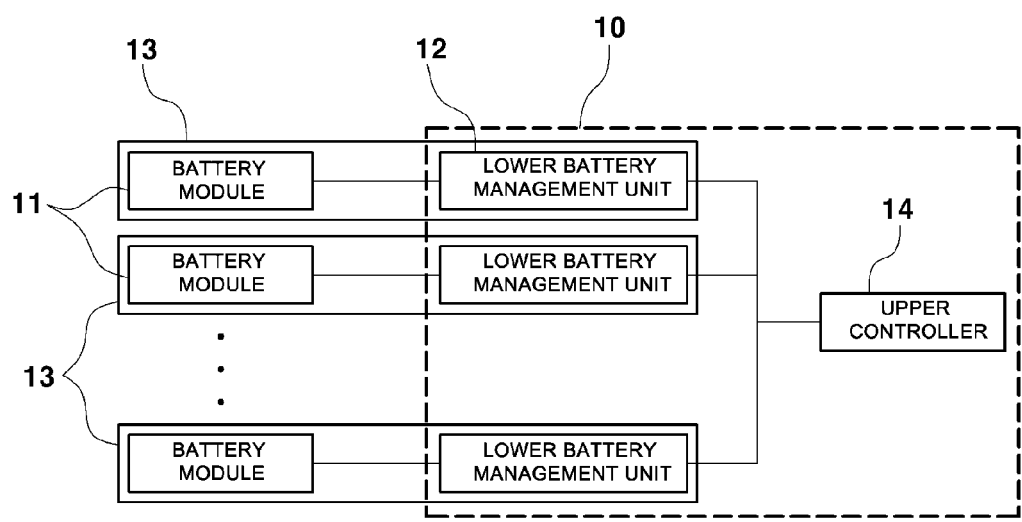
FIG. 1 is a connection configuration diagram illustrating a battery module structure according to an exemplary embodiment of the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Hereinafter, exemplary embodiments of the present disclosure so as to be easily practiced by a person skilled in the art to which the present disclosure pertains will be described in detail with reference to the accompanying drawings.

The present disclosure provides a method for automatically recognizing an addition and a removal of a lower module by an upper controller and newly updating lower module information in a battery module structure.

An exemplary embodiment of the present disclosure depends on an information exchange method using controller area network (CAN) communications which are communication protocols for a vehicle and a change detection method of battery pack information, in which to apply change situations of the lower module at the time of adding and removing the lower module. The upper controller is configured to automatically recognize the addition and removal of the lower module by exchanging a message with the lower module (lower battery manager) using a defined protocol.

Figure 2:
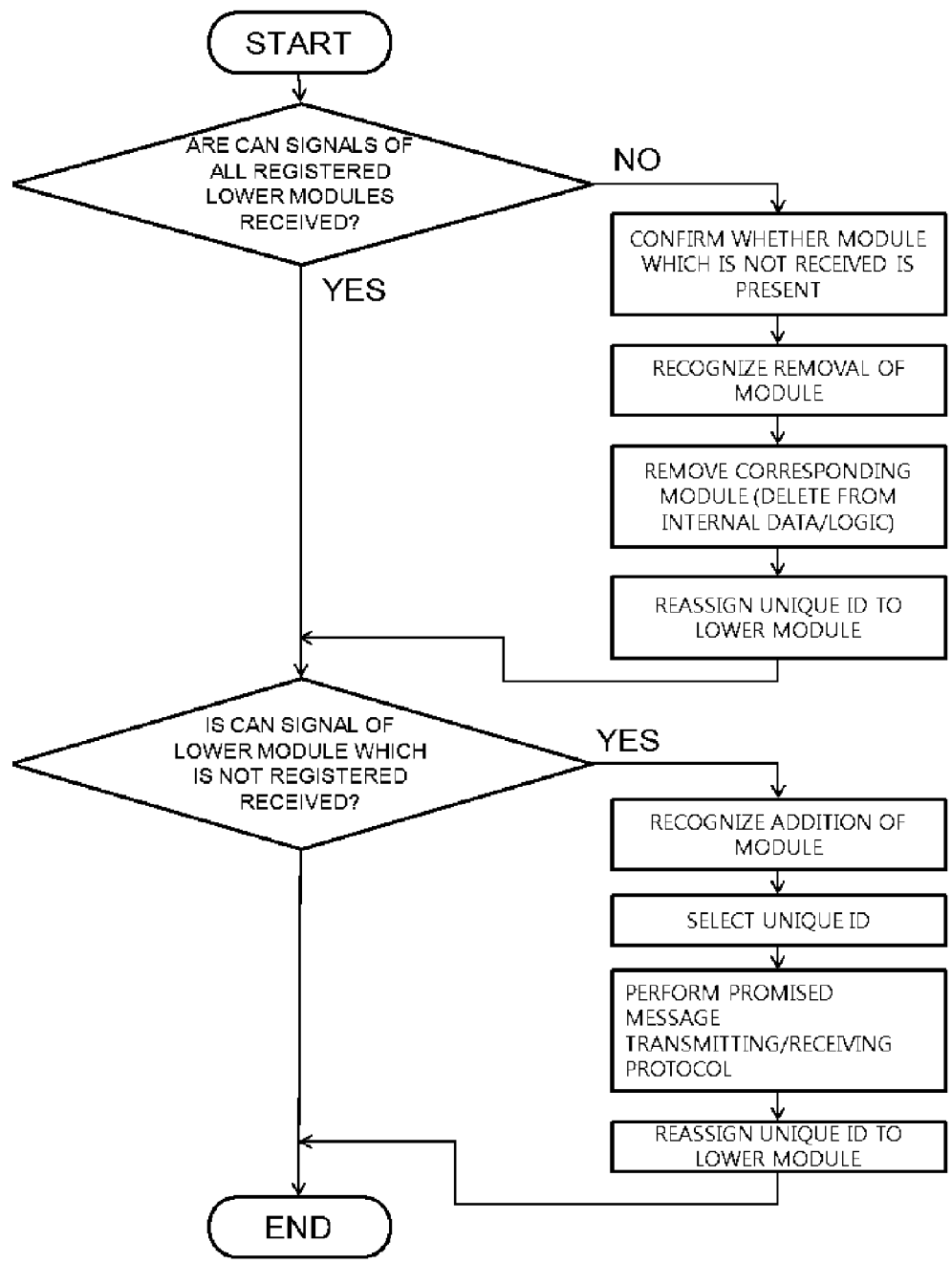
FIG. 2 is a flow chart illustrating a method for recognizing a module according to an exemplary embodiment of the present disclosure.

FIG. 1 is a diagram illustrating a battery module structure according to an exemplary embodiment of the present disclosure, and FIG. 2 is a flow chart illustrating a method for recognizing a module according to an exemplary embodiment of the present disclosure.

According to an exemplary embodiment of the present disclosure, when new lower modules 13 are added, the new lower modules 13 are automatically registered in an upper controller 14. The addition of a module is recognized and registered by transmitting a specific message, that is, a message to recognize and automatically register the addition of the module to the upper controller 14 and by automatically recognizing the addition of the module the upper controller 14 based on the message so as to assign new unique IDs to the new lower modules.

According to an exemplary embodiment of the present disclosure, the upper controller 14 recognizes when a specific lower module 13 is removed so as to delete the removed lower module 13 from internal data and logics (deletion of ID, module information, and the like). Here, the upper controller 14 recognizes that the specific lower module 13 is removed by confirming the lower module 13 which does not transmit the message.

The method for recognizing a module according to an exemplary embodiment of the present disclosure further includes confirming battery measurement information in a pack by the upper controller 14 during the step of registering or removing the lower module 13 so as to recognize whether the lower module is added or removed. In other words, the new lower modules are additionally connected, or the specific lower module is removed from pre-registered lower modules.

In the following description, the lower module 13 means a configuration (unit configuration including a battery module and a single lower battery manager connected thereto) in which a battery module 11 and a lower battery manager 12, which measures information on the battery module, are combined with each other.

The battery manager 12 of the lower module 13 configuring a battery management system (BMS) 10 has a specific CAN message ID used for registration prior to registration or an available ID range (for example, 0xAAA to 0xBBB). In the battery module structure, when the lower module 13 is newly connected to start an operation, the battery manager 12 of the new lower modules transmits the specific CAN message ID or a selected CAN message ID within the ID range to the upper controller 14 so as to be registered.

Therefore, the upper controller 14 receives the CAN message IDs to recognize that the lower modules 13, which are not registered, are newly connected. Further, in the general battery module structure, since the upper controller 14 is configured to collect information in the overall battery pack using a sensor, the upper controller 14 receives the CAN message ID while additionally recognizing a module and then confirms the battery measurement information in the pack such as voltage or current of a battery pack to recognize that the new lower modules 13 are connected. In this case, the upper controller 14 recognizes that the lower modules 13 are newly connected when the measurement information such as the voltage or the current of the battery pack is discontinuously changed when compared with the previous battery pack state.

Further, to assign the unique ID other than the ID of the pre-registered lower module to the new lower module and register the lower module, the upper controller 14 transmits a response command to the new lower module 13 through CAN communications. Therefore, after the lower module 13 responds to the upper controller 14, the upper controller assigns the new unique IDs to the added lower modules and registers the added lower modules based on mutual message protocols with the lower modules 13.

After the newly registered lower module 13 receives the unique ID information assigned at the time of the registration from the upper controller 14, the newly registered lower module 13 exchanges a message with the upper controller 14 using a relevant CAN ID based on the assigned unique ID. In this case, the CAN ID has a different range value from a message ID range transmitted prior to registration by the added lower modules 13, that is, the message ID range previously set in each of the lower modules to be used for registration.

When the plurality of lower modules are newly connected, the registration process is not largely different from the foregoing process, but when describing the registration process, each of the battery managers of the newly added lower modules 13 transmits the specific CAN message ID or the specific CAN message ID within the defined ID range to the upper controller 14 for registration. Therefore, the upper controller 14 receives the CAN message IDs transmitted by the lower modules 13 to recognize that the lower modules which are not registered are newly connected.

However, as described above, when the plurality of lower modules 13 are connected, the same ID may be present in the CAN message IDs transmitted by each of the lower modules for registration.

Therefore, the step of additionally recognizing a module according to an exemplary embodiment of the present disclosure includes confirming by each of the lower modules 13 to confirm whether another lower module transmitting the same CAN message ID is present prior to the registration based on the information exchange between each of the lower modules 13 and the upper controller 14.

When another lower module 13 transmitting the same CAN message ID is present, the lower module transmits another ID within the defined ID range to the upper controller 14, and if another lower module transmitting the same ID is not present, the corresponding message ID is continuously transmitted to the upper controller. In this case, the upper controller 14 may confirm how many lower modules 13 are newly added based on the number of messages of non-registered IDs.

When the upper controller 14 recognizes that the new lower modules 13 are connected, the upper controller 14 confirms the battery measurement information in the pack such as pack voltage or current to recognize that the newly lower modules are connected. In this case, the upper controller 14 recognizes that the lower modules 13 are newly connected, when the measurement information such as the voltage or the current of the battery pack is discontinuously changed compared with the previous battery pack state.

Next, the upper controller 14 starts to register the lower modules using the defined mutual message protocols for each of the additional lower modules 13. That is, to assign the unique ID other than the IDs of the pre-registered lower modules to the new lower modules and newly register the lower modules, the upper controller 14 transmits a response command to the new lower modules 13 through the CAN communications.

Therefore, after each of the lower modules 13 responds to the upper controller 14, the upper controller assigns the new unique IDs to the added lower modules and registers the added lower modules based on mutual message protocols with the lower modules.

After each of the newly registered lower modules 13 receives the assigned unique ID information from the upper controller 14 when registering, the newly registered lower module 13 exchanges a message with the upper controller using the relevant CAN ID based on the assigned unique ID.

Then, the upper controller 14 periodically receives the CAN messages from the registered lower modules 13 for removing the lower modules. In this case, when it is confirmed that the CAN message of the lower module of the specific ID among the registered lower modules 13 is not received, the upper controller 14 measures the information in the battery pack to confirm whether the discontinuous change occurs.

When satisfying this, the step of transmitting the response command and confirming the response to the lower module of the ID, which does not transmit the CAN message, proceeds depending on the defined message protocol to execute the step of confirming the removed lower module. When the response of the specific lower module is not present, the upper controller 14 confirms that the corresponding lower module is removed to delete (remove the corresponding lower module from registration information, internal data, logic, and the like) the information on the removed lower module, and then if necessary, newly the unique IDs are newly assigned by transmitting and receiving messages depending on the defined protocol for the remaining lower modules 13.

By doing so, the process of automatically recognizing the addition and removal of the lower modules, the process of registering the added lower modules, the process of removing the modules, and the like have been be described.

The exemplary embodiment of the present disclosure may be applied to the battery module structure having the configuration of the battery pack configured of the plurality of battery modules and the configuration of the battery management system including the lower battery manager of each of the battery modules and the upper controller controlling them and implements the automatic recognition function for addition/removal of the lower module, thereby minimizing an increase in system costs.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for updating lower module information in a battery module structure in which an upper controller controls and manages a lower module configured of a plurality of battery modules and lower battery managers connected to each of the battery modules by communicating with each of the lower battery managers, the method comprising steps of:
   when the lower module is additionally connected, recognizing, by the upper controller, the addition of the lower module by exchanging a message with the added lower module; and
   registering the added lower module by assigning, by the upper controller, a new unique ID to the added lower module by exchanging the message with the added lower module,
   wherein the step of recognizing the addition of the lower module comprises:
   when the added lower module is connected and then an operation thereof starts, transmitting, by the lower battery manager of the added lower module, the message of the added lower module to the upper controller; and
   receiving, by the upper controller, the message transmitted by the added lower module to recognize that a new lower module is connected, and
   wherein the step of recognizing the addition of the lower module further comprises:
   receiving, by the upper controller, the message of the added lower module and then confirming that measurement information in a battery pack is discontinuously changed to recognize that the new lower module is connected.

2. The method of claim 1, wherein the message transmitted by the added lower module is a specific controller area network (CAN) message ID or a message of a CAN message ID selected within a ID range.

3. The method of claim 1, wherein the message transmitted by the added lower module is a CAN message ID selected within an ID range, and
   when a plurality of lower modules are additionally connected and the added lower modules exchange information with the upper controller to confirm that another lower module transmitting a CAN message ID is present, the added lower module is set to transmit a message of another ID within an ID range.

4. The method of claim 1, wherein the step of registering the added lower module comprises:
   transmitting, by the upper controller, a response command to the added lower module through CAN communications; and
   when the lower module performs a response, assigning, by the upper controller, a new unique ID to the lower module.

5. The method of claim 1, further comprising:
   recognizing, by the upper controller, that a pre-registered lower module is removed; and
   after confirming that the lower module is removed, deleting information on the removed lower module.

6. The method of claim 5, wherein the step of recognizing that the lower module is removed comprises:
   periodically receiving, by the upper controller, a CAN message from the registered lower modules; and
   recognizing, by the upper controller, that the pre-registered lower module is removed by confirming that the CAN message of the lower module of a specific ID among the registered lower modules is not received.

7. The method of claim 5, wherein the step of recognizing that the lower module is removed comprises:
   confirming, by the upper controller, that the lower module is removed by transmitting a response command and confirming a response to the lower module of the ID which does not transmit a CAN message.

8. The method of claim 5, further comprising:
   deleting, by the upper controller, the information on the removed lower module and then newly assigning the unique ID to a rest of lower modules by exchanging the message.

9. The method of claim 6, wherein the step of recognizing that the lower module is removed further comprises:
   confirming, by the upper controller, that the lower module is removed by transmitting a response command and confirming a response to the lower module of the ID which does not transmit the CAN message.

* * * * *